(12) United States Patent
Deibel et al.

(10) Patent No.: US 11,400,414 B2
(45) Date of Patent: Aug. 2, 2022

(54) CATALYTICALLY ACTIVE PARTICULATE FILTER

(71) Applicant: UMICORE AG & CO. KG, Hanau-Wolfgang (DE)

(72) Inventors: Naina Deibel, Pfungstadt (DE); Stephanie Spiess, Darmstadt (DE); Martin Roesch, Rodgau (DE); Joerg-Michael Richter, Frankfurt (DE); Jan Schoenhaber, Darmstadt (DE); Susanne Kunert, Seeheim-Jugenheim (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/156,927

(22) Filed: Jan. 25, 2021

(65) Prior Publication Data

US 2021/0138402 A1    May 13, 2021

Related U.S. Application Data

(63) Continuation of application No. 16/495,495, filed as application No. PCT/EP2018/056919 on Mar. 20, 2018, now Pat. No. 10,933,373.

(30) Foreign Application Priority Data

Mar. 23, 2017 (EP) ..................... 17162471

(51) Int. Cl.
   *F01N 3/00*    (2006.01)
   *B01D 53/94*   (2006.01)
   (Continued)

(52) U.S. Cl.
   CPC ............ *B01D 53/945* (2013.01); *B01J 23/63* (2013.01); *B01D 2255/1021* (2013.01);
   (Continued)

(58) Field of Classification Search
   CPC .......... F01N 3/021; F01N 3/101; F01N 3/035; B01D 53/9494; B01D 53/945;
   (Continued)

(56) References Cited

U.S. PATENT DOCUMENTS 7,799,298 B2    9/2010   Pfeifer et al.
8,066,963 B2    11/2011  Klingmann et al.
(Continued)

FOREIGN PATENT DOCUMENTS

CN    1863586 A      11/2006
CN    101553304 A    10/2009
(Continued)

OTHER PUBLICATIONS

International Search Report for PCT/EP2018/056919, dated May 11, 2018 (8 pgs, with English translation).

(Continued)

*Primary Examiner* — Jason D Shanske
(74) *Attorney, Agent, or Firm* — Smith, Gambrell & Russell, LLP

(57) ABSTRACT

The present invention relates to a particulate filter which comprises a wall flow filter of length L and three mutually different catalytically active coatings X, Y and Z, wherein the wall flow filter comprises channels E and A that extend in parallel between a first and a second end of the wall flow filter and are separated by porous walls forming surfaces $O_E$ and, respectively, $O_A$, and wherein the channels E are gas-tightly sealed at the second end and the channels A are gas-tightly sealed at the first end, characterized in that the coating X is located in the porous walls, the coating Y is located in the channels E on the surfaces $O_E$ and the coating Z is located in the channels A on the surfaces $O_A$.

16 Claims, 1 Drawing Sheet

(51) Int. Cl.
*B01J 23/63* (2006.01)
*B01J 35/00* (2006.01)
*B01J 35/04* (2006.01)
*B01J 37/02* (2006.01)
*F01N 3/035* (2006.01)

(52) U.S. Cl.
CPC ........... *B01D 2255/1023* (2013.01); *B01D 2255/1025* (2013.01); *B01D 2255/9155* (2013.01); *B01J 35/0006* (2013.01); *B01J 35/04* (2013.01); *B01J 37/0244* (2013.01); *F01N 3/035* (2013.01)

(58) Field of Classification Search
CPC .... B01D 2255/1021; B01D 2255/1023; B01D 2255/1025; B01D 2255/9155; B01J 23/63; B01J 35/0006; B01J 37/0244
USPC ............................................................ 60/274
See application file for complete search history.

(56) References Cited

U.S. PATENT DOCUMENTS

| | | | |
|---|---|---|---|
| 8,173,087 B2 | 5/2012 | Wei et al. | |
| 8,713,922 B2 | 5/2014 | Yano et al. | |
| 8,844,274 B2* | 9/2014 | Lambert | F01N 3/2066 60/297 |
| 9,051,857 B2 | 6/2015 | Domhaus et al. | |
| 9,347,354 B2 | 5/2016 | Pfeifer et al. | |
| 9,352,279 B2 | 5/2016 | Greenwell | |
| 9,708,946 B2 | 7/2017 | Daido et al. | |
| 2007/0110650 A1 | 5/2007 | Pfeifer et al. | |
| 2009/0087365 A1 | 4/2009 | Klingmann et al. | |
| 2010/0055012 A1 | 3/2010 | Grisstede et al. | |
| 2010/0275579 A1 | 11/2010 | Klingmann et al. | |
| 2010/0293930 A1* | 11/2010 | Li | B01D 53/9454 60/299 |
| 2011/0030346 A1 | 2/2011 | Neubauer et al. | |
| 2011/0123421 A1* | 5/2011 | Gru | B01J 23/40 423/212 |
| 2011/0179777 A1 | 7/2011 | Chandler et al. | |
| 2012/0186229 A1 | 7/2012 | Phillips et al. | |
| 2012/0222411 A1* | 9/2012 | Yano | B01D 53/9418 60/297 |
| 2012/0304623 A1 | 12/2012 | Springer et al. | |
| 2014/0234189 A1 | 8/2014 | Clowes et al. | |
| 2014/0241950 A1* | 8/2014 | Chandler | F01N 3/10 422/171 |
| 2017/0368536 A1 | 12/2017 | Despres et al. | |
| 2018/0111088 A1* | 4/2018 | Li | B01J 37/0244 |
| 2018/0111089 A1* | 4/2018 | Li | B01J 37/024 |
| 2018/0298800 A1* | 10/2018 | Clowes | B01J 23/63 |
| 2019/0240643 A1 | 8/2019 | Karpov | |
| 2019/0291083 A1 | 9/2019 | Komata et al. | |
| 2019/0299192 A1 | 10/2019 | Gu et al. | |
| 2020/0182115 A1 | 6/2020 | Cravillon et al. | |
| 2020/0188885 A1 | 6/2020 | Itani et al. | |

FOREIGN PATENT DOCUMENTS

| | | |
|---|---|---|
| CN | 101970817 A | 2/2011 |
| CN | 102196853 A | 9/2011 |
| CN | 102574056 A | 7/2012 |
| CN | 102575544 A | 7/2012 |
| CN | 102762827 A | 10/2012 |
| CN | 102808677 A | 12/2012 |
| CN | 104254387 | 12/2013 |
| CN | 103781532 A | 5/2014 |
| CN | 105008025 A | 10/2015 |
| CN | 105143620 A | 12/2015 |
| DE | 10 2011 050 788 A1 | 12/2012 |
| EP | 1 486 248 A1 | 12/2004 |
| EP | 1 657 410 A2 | 5/2006 |
| EP | 2 042 225 A1 | 4/2009 |
| EP | 2 042 226 A2 | 4/2009 |
| EP | 2 461 895 B2 | 6/2012 |
| EP | 2 489 844 A1 | 8/2012 |
| EP | 3 045 226 A1 | 7/2016 |
| FR | 3 020 091 A1 | 10/2015 |
| WO | 01/12320 A1 | 2/2001 |
| WO | 2005/014146 A1 | 2/2005 |

OTHER PUBLICATIONS

Written Opinion of the International Searching Authority for PCT/EP2018/056919, dated May 11, 2018 (5pgs.).
International Preliminary Report on Patentability dated Sep. 24, 2019 in International Patent Application No. PCTZEP2018/056919 (6 pages in German with English translation),.
DIN 66132: Bestimmung der spezifischen Oberflache von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation),.
Search Report dated Feb. 10, 2021 for Chinese Patent Application No. 201880015797.9 (7 pages in Chinese with translation).
First Office Action dated Feb. 23, 2021 for Chinese Patent Application No. 201880015797.9 (5 pages).

* cited by examiner

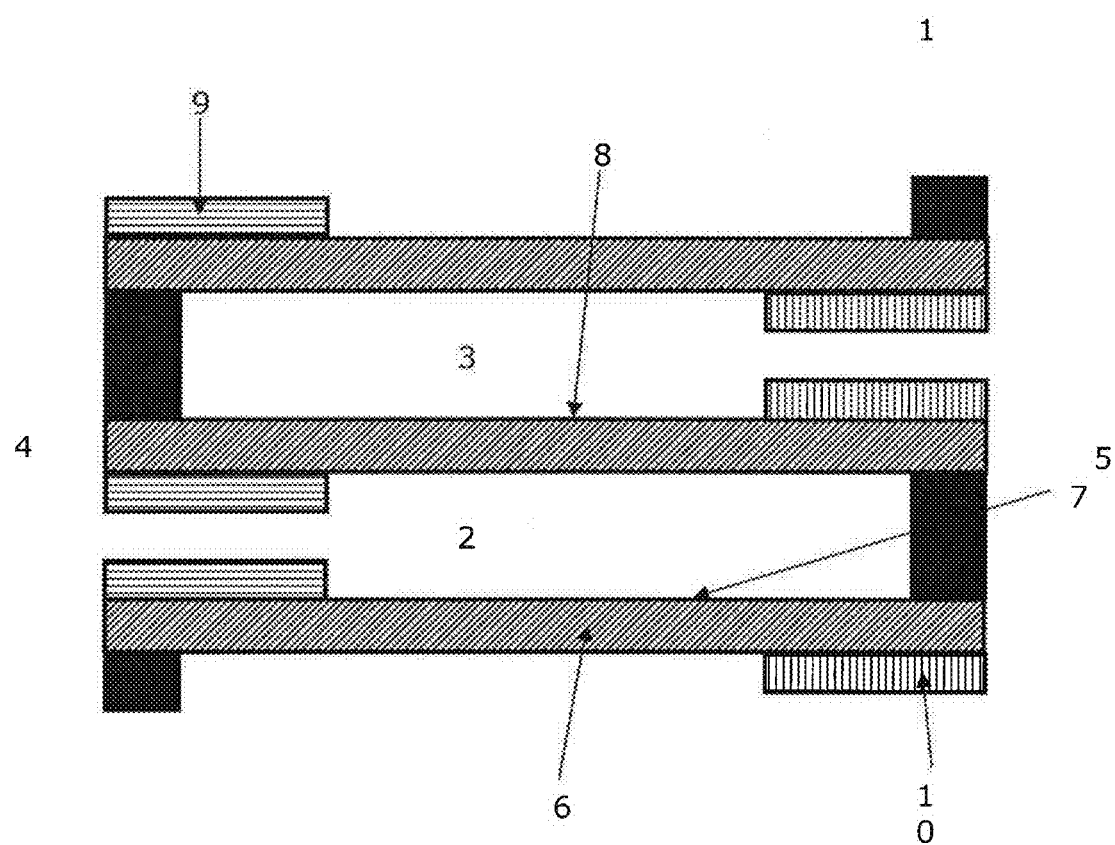

CATALYTICALLY ACTIVE PARTICULATE FILTER

BACKGROUND OF THE INVENTION

The present invention relates to a catalytically active particulate filter that is particularly suitable for the removal of particles, carbon monoxide, hydrocarbons and nitrogen oxides from the exhaust gas of internal combustion engines fueled by a stoichiometric air-fuel mixture.

Exhaust gases from combustion engines, i.e. gasoline engines, fueled by stoichiometric air-fuel mixtures are cleaned in conventional methods with the aid of three-way catalytic converters. Such catalytic converters are capable of simultaneously converting the three major gaseous pollutants of the engine, namely hydrocarbons, carbon monoxide and nitrogen oxides, into harmless components.

In addition to such gaseous pollutants, the exhaust gas from gasoline engines also contains extremely fine particles (PM), which arise from the incomplete combustion of the fuel and essentially consist of soot. In contrast to the particle emission of diesel engines, the particles in the exhaust gas of stoichiometrically operated gasoline engines are very small and have an average particle size of less than 1 µm. Typical particle sizes range from 10 to 200 nm. Furthermore, the amount of particles emitted is very low and ranges from 2 to 4 mg. The European exhaust emission standard EU-6c is associated with a conversion of the limit value for such particles from the particle mass limit value to a more critical particle number limit value of $6 \times 10^{11}$/km (in the Worldwide Harmonized Light Vehicles Test Cycle—WLTP). This creates a need for exhaust gas cleaning concepts for stoichiometrically operated combustion engines, which include effectively operating equipment for removing particles.

Wall flow filters made of ceramic materials, such as silicon carbide, aluminum titanate and cordierite, have proven themselves in the field of cleaning exhaust gases from lean-burn engines, i.e. in particular diesel engines. These wall flow filters are made up of a large number of parallel channels formed by porous walls. The channels are alternately sealed in a gas-tight manner at one of the two ends of the filter so that channels A, which are open at the first side of the filter and sealed at the second side of the filter, and channels B, which are sealed at the first side of the filter and open at the second side of the filter, are formed. For example, exhaust gas flowing into channels A can only leave the filter via channels B, and must flow through the porous walls between channels A and B for this purpose. When the exhaust gas passes through the wall, the particles are retained and the exhaust gas is cleaned. The particles retained in this manner must then be burnt off or oxidized in order to prevent a clogging of the filter or an unacceptable increase in the back pressure of the exhaust system. For this purpose, the wall flow filter is, for example, provided with catalytically active coatings that reduce the ignition temperature of soot.

Applying such coatings to the porous walls between the channels (so-called "on-wall coating") or introducing them into the porous walls (so-called "in-wall coating") is already known. EP 1 657 410 A2 also already describes a combination of both coating types; that is, part of the catalytically active material is present in the porous walls and another part is present on the porous walls.

The concept of removing particles from the exhaust gas using wall flow filters has already been applied to the cleaning of exhaust gas from gasoline engines operated with stoichiometric air-fuel mixtures; see, for example, EP 2042226 A2. According to its teaching, a wall flow filter comprises two layers arranged one above the other, wherein one can be arranged in the porous wall and the other can be arranged on the porous wall.

DE 102011050788 A1 pursues a similar concept. There, the porous filter walls contain a catalyst material of a three-way catalytic converter, while the partition walls additionally comprise a catalyst material of a three-way catalytic converter in the respective end sections, both on the inflow side and on the outflow side.

FR 3 020 091 A1 discloses a particulate filter that comprises a coating in the porous walls along with coatings on the surfaces of the inlet and outlet channels. The latter extend over a partial area of the filter length, both on the inlet and outlet surfaces on the side of the filter at which the exhaust gas enters.

There is still a need for catalytically active particulate filters that combine the functionalities of a particulate filter and a three-way catalytic converter and at the same time adhere to the limits that will apply in the future.

The present invention relates to a particulate filter which comprises a wall flow filter of length L and three mutually different coatings X, Y and Z, wherein the wall flow filter comprises channels E and A that extend in parallel between a first and a second end of the wall flow filter and are separated by porous walls forming surfaces $O_E$ and $O_A$, respectively, and wherein the channels E are sealed in a gas-tight manner at the second end and the channels A are sealed in a gas-tight manner at the first end, characterized in that coating X is located in the porous walls, coating Y is located in the channels E on the surfaces $O_E$ and coating Z is located in the channels A on the surfaces $O_A$.

The coatings X, Y and Z are catalytically active, especially at operating temperatures of 250 to 1100° C. They are different from each other, but all three usually contain one or more precious metals fixed to one or more substrate materials and one or more oxygen storage components. The coatings X, Y and Z may differ in the components they contain. For example, they may differ in terms of the precious metals they contain or the oxygen storage components they contain. However, they may also contain identical components, but such components must then be present in different quantities.

The coatings X, Y and Z preferably do not contain SCR catalysts, especially no metal-exchanged molecular sieves.

Platinum, palladium and rhodium are particularly suitable as precious metals, wherein palladium, rhodium or palladium and rhodium are preferred.

The precious metals are usually used in quantities of 0.4 to 4 g/l based on the volume of the wall flow filter.

As substrate materials for the precious metals, all materials familiar to the person skilled in the art can be considered for this purpose. Such materials are in particular metal oxides with a BET surface area of 30 to 250 m²/g, preferably 100 to 200 m²/g (determined according to DIN 66132). Particularly suitable substrate materials for the precious metals are selected from the series consisting of aluminum oxide, doped aluminum oxide, silicon oxide, titanium dioxide and mixed oxides of one or more of these.

Doped aluminum oxides are, for example, aluminum oxides doped with lanthanum oxide, zirconium oxide and/or titanium oxide. Lanthanum-stabilized aluminum oxide is advantageously used, wherein lanthanum is used in quantities of 1 to 10% by weight, preferably 3 to 6% by weight, in each case calculated as $La_2O_3$ and based on the weight of the stabilized aluminum oxide.

BRIEF DESCRIPTION OF THE DRAWING

FIG. 1 shows a particulate filter in accordance with the invention.

INVENTION DESCRIPTION

Cerium/zirconium/rare earth metal mixed oxides are particularly suitable as oxygen storage components. The term "cerium/zirconium/rare earth metal mixed oxide" within the meaning of the present invention excludes physical mixtures of cerium oxide, zirconium oxide and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide. Depending on the manufacturing process, however, not completely homogeneous products may arise which can generally be used without any disadvantage.

In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the mixed cerium/zirconium/rare earth metal mixed oxides.

Lanthanum oxide, yttrium oxide and/or praseodymium oxide are preferred. Lanthanum oxide and/or yttrium oxide are particularly preferred, and lanthanum oxide and yttrium oxide, yttrium oxide and praseodymium oxide, and lanthanum oxide and praseodymium oxide are more particularly preferred.

In accordance with the invention, the ratio of cerium oxide to zirconium oxide in the cerium/zirconium/rare earth metal mixed oxides can vary within wide limits. It amounts to, for example, 0.1 to 1.0, preferably from 0.2 to 0.7, more preferably from 0.3 to 0.5.

The oxygen storage components are usually used in quantities of 50 to 120 g/l based on the volume of the wall flow filter.

In the embodiments of the present invention, one or more of the coatings X, Y and Z contain an alkaline earth compound, such as barium oxide or barium sulfate, Preferred embodiments contain barium sulfate in the coatings X and Y. The amount of barium sulfate per coating particularly amounts to 5 to 20 g/l of the volume of the wall flow filter.

In further embodiments of the present invention, one or more of the coatings X, Y and Z contain additives, such as rare earth compounds, such as lanthanum oxide, and/or binders, such as aluminum compounds. Such additives are used in quantities that can vary within wide limits and that the person skilled in the art can determine in the specific case by simple means.

In embodiments of the present invention, the coating X comprises lanthanum-stabilized aluminum oxide, palladium or palladium and rhodium, a first oxygen storage component comprising zirconium oxide, cerium oxide, yttrium oxide and lanthanum oxide, and a second oxygen storage component comprising zirconium oxide, cerium oxide, yttrium oxide and praseodymium oxide. The coating X preferably comprises lanthanum-stabilized aluminum oxide in quantities of 20 to 40% by weight, more preferably 25 to 30% by weight, based on the total weight of the coating X. The coating X preferably comprises each of the two oxygen storage components in amounts of 25 to 35% by weight based on the total weight of the coating X.

In embodiments of the present invention, the coating X extends over the entire length L of the wall flow filter. The loading of the wall flow filter with coating X preferably amounts to 25 to 150 g/l based on the volume of the wall flow filter.

In embodiments of the present invention, the coating Y comprises lanthanum-stabilized aluminum oxide, palladium or palladium and rhodium and an oxygen storage component comprising zirconium oxide, cerium oxide, lanthanum oxide and praseodymium oxide.

The coating preferably comprises X lanthanum-stabilized aluminum oxide in quantities of 30 to 60% by weight, more preferably 40 to 50% by weight, based on the total weight of the coating Y. The coating Y preferably comprises the oxygen storage component in quantities of 30 to 60% by weight, more preferably 40 to 50% by weight, based on the total weight of the catalytically active coating Y.

In embodiments of the present invention, the coating Y extends from the first end of the wall flow filter over 20 to 70%, preferably 25 to 61%, of the length L of the wall flow filter. The loading of the wall flow filter with coating Y preferably amounts to 50 to 70 g/l based on the volume of the wall flow filter.

In embodiments of the present invention, the coating Z comprises lanthanum-stabilized aluminum oxide, palladium or palladium and rhodium and an oxygen storage component comprising zirconium oxide, cerium oxide, lanthanum oxide and yttrium oxide.

The coating Z preferably comprises lanthanum-stabilized aluminum oxide in quantities of 40 to 65% by weight, more preferably 50 to 60% by weight, based on the total weight of the coating Z. The coating Z preferably comprises the oxygen storage component in quantities of 30 to 60% by weight, more preferably 40 to 50% by weight, based on the total weight of the coating Z.

In embodiments of the present invention, the coating Z extends from the second end of the wall flow filter over 20 to 70%, preferably 25 to 61%, of its length L. The loading of the wall flow filter with coating Z preferably amounts to 50 to 70 g/l based on the volume of the wall flow filter.

In embodiments of the present invention, the sum of the lengths of coatings Y and Z is less than the total filter length L, preferably ≤90%, more preferably ≤80%, of the total filter length L.

In one embodiment of the present invention, the present invention relates to a particulate filter which comprises a wall flow filter of length L and three mutually different coatings X, Y and Z, wherein the wall flow filter comprises channels E and A that extend in parallel between a first and a second end of the wall flow filter and are separated by porous walls forming surfaces $O_E$ and $O_A$, respectively, and wherein the channels E are sealed in a gas-tight manner at the second end and the channels A are sealed in a gas-tight manner at the first end, characterized in that the coating X is located in the porous walls, extends over the entire length L of the wall flow filter, and contains lanthanum-stabilized aluminum oxide in an amount of 25 to 30% by weight based on the total weight of the coating X, palladium or palladium and rhodium, a first oxygen storage component comprising zirconium oxide, cerium oxide, yttrium oxide and lanthanum oxide in an amount of 25 to 35% by weight based on the total weight of the coating X, and a second oxygen storage component comprising zirconium oxide, cerium oxide, yttrium oxide and praseodymium oxide in an amount of 25 to 35% by weight based on the total weight of the coating X, and the coating Y is located in the channels E on the surfaces $O_E$, extends from the first end of the wall flow filter to 25 to 75% of its length L and contains lanthanum-stabilized aluminum oxide in an amount of 40 to 50% by weight based on the total weight of the coating Y, palladium or palladium and rhodium and an oxygen storage component comprising zirconium oxide, cerium oxide, lanthanum oxide and praseodymium oxide in an amount of 40 to 50% by weight based on the total weight of the coating Y, and the coating Z is located in the channels A on the surfaces $O_A$, extends from the second end of the wall flow filter to 25 to 75% of its length L and contains lanthanum-stabilized aluminum oxide in an amount of 50 to 60% by weight based on the total weight of the coating Z, palladium or palladium and rhodium and an oxygen storage component comprising zirconium oxide, cerium oxide, lanthanum oxide and yttrium oxide in an amount of 40 to 50% by weight based on the total weight of the coating Z.

Wall flow filters that can be used in accordance with the present invention are well-known and available on the market, They consist of, for example, silicon carbide, aluminum titanate or cordierite, and have, for example, a cell density of 200 to 400 cells per inch and usually a wall thickness between 6 and 12 mil, or 0.1524 and 0.305 millimeters.

In the uncoated state, they have porosities of 50 to 80, in particular 55 to 75%, for example. Their average pore size in the uncoated state amounts to 10 to 25 micrometers, for example. As a rule, the pores of the wall flow filter are so-called "open pores;" that is, they have a connection to the channels. In addition, the pores are usually interconnected with one another. This allows, on the one hand, easy coating of the inner pore surfaces and, on the other hand, easy passage of the exhaust gas through the porous walls of the wall flow filter.

The particulate filter in accordance with the invention can be produced according to methods known to the person skilled in the art, for example by applying a coating suspension, which is usually called a washcoat, to the wall flow filter by means of one of the usual dip coating methods or pump and suction coating methods. Thermal post-treatment or calcination usually follow. The coatings X, Y and Z are obtained in separate and successive coating steps.

The person skilled in the art knows that the average pore size of the wall flow filter and the average particle size of the catalytically active materials must be matched to each other in order to achieve an on-wall coating or an in-wall coating. In the case of an in-wall coating, the average particle size of the catalytically active materials must be small enough to penetrate the pores of the wall flow filter. In contrast, in the case of an on-wall coating, the average particle size of the catalytically active materials must be large enough not to penetrate the pores of the wall flow filter.

In embodiments of the present invention, the coating suspension for the production of the coating X is ground up to a particle size distribution of $d_{50}=1$ to 3 μm and $d_{99}=9$ to 5 μm. In embodiments of the present invention, the coating suspension for the production of the coating Y is ground up to a particle size distribution of $d_{50}=4$ to 8 μm and $d_{99}=22$ to 16 μm; In embodiments of the present invention, the coating suspension for the production of the coating Z is ground up to a particle size distribution of $d_{50}=4$ to 8 μm and $d_{99}=22$ to 16 μm.

FIG. 1 shows a particulate filter in accordance with the invention which comprises a wall flow filter of length L (1) with channels E (2) and channels A (3) extending in parallel between a first end (4) and a second end (5) of the wall flow filter and separated by porous walls (6) forming surfaces $O_E$ (7) and $O_A$ (8), respectively, and wherein the channels E (2) are sealed in a gas-tight manner at the second end (5) and the channels A (3) are sealed in a gas-tight manner at the first end (4). The coating X is located in the porous walls (6), the coating Y (9) is located in the channels E (2) on the surfaces $O_E$ (7) and the coating Z (10) is located in the channels A (3) on the surfaces $O_A$ (8).

The invention is explained in more detail in the following examples.

COMPARATIVE EXAMPLE 1

Aluminum oxide stabilized with 4% by weight lanthanum oxide and a cerium/zirconium mixed oxide with a cerium oxide content of 40% by weight were suspended in water. The suspension thus obtained was then mixed with a palladium nitrate solution and a rhodium nitrate solution under constant stirring. The resulting coating suspension was used directly to coat a commercially available wall flow filter substrate. In this case, the coating suspension was introduced into the filter walls of the substrate. The coated filter thus obtained was dried and then calcined.

The total load of the filter VGPF1 thus obtained amounted to 125 g/l, the total precious metal load amounted to 2.58 g/l with a ratio of palladium to rhodium of 5.1:1.

COMPARATIVE EXAMPLE 2 a) Aluminum oxide stabilized with 4% by weight lanthanum oxide and a cerium/zirconium mixed oxide with a cerium oxide content of 33% by weight were suspended in water. The suspension thus obtained was then mixed with a palladium nitrate solution and a rhodium nitrate solution under constant stirring. The resulting coating suspension was used directly to coat a commercially available wall flow filter substrate. In this case, the coating suspension was introduced into the filter walls of the substrate. The coated filter thus obtained was dried and then calcined.

The total load of this layer amounted to 100 g/l; the total precious metal load amounted to 2.05 g/l with a ratio of palladium to rhodium of 3.9:1.

b) Aluminum oxide stabilized with 4% by weight lanthanum oxide and cerium/zirconium mixed oxide with a cerium oxide content of 40% by weight were suspended in water. The suspension thus obtained was then mixed with a palladium nitrate solution under constant stirring. The resulting coating suspension was used directly to coat the wall flow filter substrate obtained in a) above. In this case, the coating suspension was applied with a load of 57 g/l to the wall surfaces only in the inflow channels over a length of 25% of the total length. The coated filter thus obtained was dried and then calcined.

The total precious metal load of the filter VGPF2 thus obtained amounted to 2.58 g/l with a ratio of palladium to rhodium of 5:1.

EXAMPLE 1 a) Aluminum oxide stabilized with 4% by weight lanthanum oxide and cerium/zirconium mixed oxide with a cerium oxide content of 33% by weight were suspended in water. The suspension thus obtained was then mixed with a palladium nitrate solution and a rhodium nitrate solution under constant stirring. The resulting coating suspension was used directly to coat a commercially available wall flow filter substrate. In this case, the coating suspension was introduced into the filter walls of the substrate. The coated filter thus obtained was dried and then calcined.

The total load of this layer amounted to 100 g/l; the total precious metal load amounted to 1.93 g/l with a ratio of palladium to rhodium of 4.7:1.

b) The coated wall flow filter obtained according to a) was provided with a second coating as specified in comparative example 2, step b).

c) Aluminum oxide stabilized with 4% by weight lanthanum oxide and cerium/zirconium mixed oxide with a cerium oxide content of 24% by weight were suspended in water. The suspension thus obtained was then mixed with a palladium nitrate solution and then with a rhodium nitrate solution under constant stirring. The resulting coating suspension was used directly to coat the wall flow filter substrate obtained in step b). In this case, the coating suspension was applied with a load of 54 g/l to the wall surfaces over a length of 25% of the total length only in the still uncoated outflow channels of the substrate. The coated filter thus obtained was dried and then calcined.

The total precious metal load of the filter GPF1 thus obtained amounted to 2.58 g/l with a ratio of palladium to rhodium of 5:1.

EXAMPLE 2

Example 1 was repeated with the difference that cerium/zirconium mixed oxide was not used in step b).

The total precious metal load of the filter GPF2 thus obtained amounted to 2.58 g/l with a ratio of palladium to rhodium of 5:1.

Catalytic Characterization

The catalytically active particulate filters VGPF1, VGPF2, GPF1 and GPF2 were each tested in the fresh state and the aged state in the "lambda sweep test."

The particulate filters were aged together in an engine test bench aging process. This aging process consists of an overrun cut-off aging process with an exhaust gas temperature of 950° C. before the catalyst inlet (maximum bed temperature of 1030° C.). The aging time amounted to 76 hours.

Following aging, a part of each of the particulate filters VGPF1, VGPF2, GPF1 and GPF2 was loaded with 5 g/l soot on an engine test bench.

Subsequently, an engine test bench was used to test the starting behavior at a constant average air ratio $\lambda$, and the dynamic conversion upon a change to $\lambda$ was examined.

The following tables contain the temperatures $T_{50}$ at which 50% of the component under consideration is converted. In this case, the starting behavior with stoichiometric exhaust gas composition ($\lambda$=0.999 with ±3.4% amplitude) was determined.

Table 1 contains the data for the fresh particulate filters, Table 2 contains the data for the aged particulate filters and Table 3 contains the data for the particulate filters loaded with soot.

TABLE 1

| | $T_{50}$ HC stoichiometric | $T_{50}$ CO stoichiometric | $T_{50}$ NOx stoichiometric |
|---|---|---|---|
| VGPF1 | 260 | 254 | 257 |
| VGPF2 | 251 | 243 | 246 |

TABLE 1-continued

| | $T_{50}$ HC stoichiometric | $T_{50}$ CO stoichiometric | $T_{50}$ NOx stoichiometric |
|---|---|---|---|
| GPF1 | 252 | 240 | 245 |
| GPF2 | 246 | 234 | 237 |

TABLE 2

| | $T_{50}$ HC stoichiometric | $T_{50}$ CO stoichiometric | $T_{50}$ NOx stoichiometric |
|---|---|---|---|
| VGPF1 | 415 | 439 | 429 |
| VGPF2 | 404 | 424 | 418 |
| GPF1 | 402 | 416 | 412 |
| GPF2 | 403 | 422 | 416 |

TABLE 3

| | $T_{50}$ HC stoichiometric | $T_{50}$ CO stoichiometric | $T_{50}$ NOx stoichiometric |
|---|---|---|---|
| VGPF1 | 392 | 403 | 402 |
| VGPF2 | 390 | 399 | 401 |
| GPF1 | 385 | 394 | 395 |
| GPF2 | 385 | 394 | 397 |

The dynamic conversion behavior of the particulate filters was determined in a range for $\lambda$ from 0.99 to 1.01 at a constant temperature of 510° C. The amplitude of $\lambda$ in this case amounted to ±3.4%. Table 4 shows the conversion at the intersection of the CO and NOx conversion curves, along with the associated HC conversion of the aged particulate filters. Table 5 shows the corresponding points of the filters loaded with soot.

TABLE 4

| | CO/NOx conversion at the intersection | HC conversion at the $\lambda$ of the CO/NOx intersection |
|---|---|---|
| VGPF1 | 64% | 94% |
| VGPF2 | 72% | 95% |
| GPF1 | 78% | 95% |
| GPF2 | 72% | 95% |

TABLE 5

| | CO/NOx conversion at the intersection | HC conversion at the $\lambda$ of the CO/NOx intersection |
|---|---|---|
| VGPF1 | 69% | 95% |
| VGPF2 | 78% | 96% |
| GPF1 | 85% | 96% |
| GPF2 | 80% | 95% |

In comparison to VGPF1 and VGPF2, the particulate filters GPF1 and GPF2 in accordance with the invention show a clear improvement in starting behavior and dynamic CO/NOx conversion, both in the fresh state and in the aged state with and without additionally applied soot.

The invention claimed is:
1. Particulate filter for removing particulates, carbon monoxide, hydrocarbons and nitrogen oxides from the exhaust gas of internal combustion engines operated with a stoichiometric air-fuel mixture, which particulate filter comprises a wall flow filter of length L and coatings X, Y and Z of three different coating compositions, wherein the wall flow filter comprises channels E and A that extend in parallel between a first and a second end of the wall flow filter and are separated by porous walls forming surfaces $O_E$ and $O_A$, respectively, and wherein the channels E are sealed in a gas-tight manner at the second end and the channels A are sealed in a gas-tight manner at the first end, characterized in that coating X is located in the porous walls, coating Y is located in the channels E on the surfaces $O_E$ and coating Z is located in the channels A on the surfaces $O_A$, and wherein each of the coatings X, Y and Z contains one or more of the precious metals platinum, palladium, and rhodium, and the particulate filter further comprising substrate materials for the precious metals, which substrate materials are selected from the series consisting of aluminum oxide, doped aluminum oxide, silicon oxide, titanium dioxide and mixed oxides of one or more of these, and wherein coating X has a substrate material loading, per weight based on the total weight of coating X, that is less than the substrate material loading of coating Y, per weight based on the total weight of coating Y, and also less than the substrate material loading of coating Z, per weight based on the total weight of coating Z.

2. Particulate filter in accordance with claim 1, wherein the coating X extends over the entire length L of the wall flow filter, and coating Y is present only in channels E, and coating Z is present only in channels A.

3. Particulate filter in accordance with claim 1, wherein the coating Y extends from the first end of the wall flow filter over 20 to 70% of the length L of the wall flow filter, and the catalytically active coating Z extends from the second end of the wall flow filter over 20 to 70% of the length L of the wall flow filter, and a presence of the coating composition for coating Y is limited to channels E, and a presence of the coating composition for coating Z is limited to channels A.

4. Particulate filter in accordance with claim 1, wherein the sum of the lengths of the coatings Y and Z is less than the total filter length L, and wherein each of the coatings X, Y and Z contains one or both of the precious metals palladium and rhodium.

5. Particulate filter in accordance with claim 1, wherein at least coatings Y and Z further comprise cerium/zirconium/rare earth metal mixed oxides as oxygen storage components.

6. Particulate filter in accordance with claim 5, wherein each of the coatings X, Y and Z comprise the cerium/zirconium/rare earth metal mixed oxides, with the rare earth metal mixed oxides containing lanthanum oxide, yttrium oxide, praseodymium oxide, neodymium oxide and/or samarium oxide, with the oxygen storage components composition for coating X being different than that of at least one of Y and Z.

7. Particulate filter in accordance with claim 5, wherein the cerium/zirconium/rare earth metal mixed oxides contain lanthanum oxide and yttrium oxide, yttrium oxide and praseodymium oxide or lanthanum oxide and praseodymium oxide as rare earth metal oxide, and wherein the oxygen storage components composition for each of coatings X, Y and Z is different in composition.

8. Particulate filter in accordance with claim 1, wherein the coating X contains lanthanum-stabilized aluminum oxide, palladium or palladium and rhodium, a first oxygen storage component comprising zirconium oxide, cerium oxide, yttrium oxide and lanthanum oxide, and a second oxygen storage component comprising zirconium oxide, cerium oxide, yttrium oxide and praseodymium oxide.

9. Particulate filter in accordance with claim 1, wherein the coating Y contains lanthanum-stabilized aluminum oxide, palladium or palladium and rhodium and an oxygen storage component comprising zirconium oxide, cerium oxide, lanthanum oxide and praseodymium oxide.

10. Particulate filter in accordance with claim 1, wherein the coating Z contains lanthanum-stabilized aluminum oxide, palladium or palladium and rhodium and an oxygen storage component comprising zirconium oxide, cerium oxide, lanthanum oxide and yttrium oxide, and wherein the coatings X, Y and Z are each free of metal exchanged molecular sieves.

11. Particle filter according to claim 1, wherein a $d_{50}$ particle size distribution for the X coating is 1 to 3 µm, and for each of coatings Y and Z is from 4 to 8 µm.

12. Particle filter according to claim 11, wherein the $d_{99}$ particle size distribution for the X coating is 9 to 5 µm, and for each of coatings Y and Z is from 22 to 16 µm.

13. Particulate filter for removing particulates, carbon monoxide, hydrocarbons and nitrogen oxides from the exhaust gas of internal combustion engines operated with a stoichiometric air-fuel mixture, which particulate filter comprises a wall flow filter of length L and three mutually different coatings X, Y and Z, wherein the wall flow filter comprises channels E and A that extend in parallel between a first and a second end of the wall flow filter and are separated by porous walls forming surfaces $O_E$ and $O_A$, respectively, and wherein the channels E are sealed in a gas-tight manner at the second end and the channels A are sealed in a gas-tight manner at the first end, characterized in that coating X is located in the porous walls, coating Y is located in the channels E on the surfaces $O_E$ and not on the surfaces $O_A$, and coating Z is located in the channels A on the surfaces $O_A$ and not on the surfaces $O_E$, wherein each of the coatings X, Y and Z contains one or more of the precious metals platinum, palladium, and rhodium, wherein each of the coatings X, Y and Z comprise oxygen storage components, and substrate materials for the precious metals that are selected from the series consisting of aluminum oxide, doped aluminum oxide, silicon oxide, titanium dioxide and mixed oxides of one or more of these, and each of the coatings X, Y and Z has a different type of oxygen storage components composition, and wherein each of the coatings X, Y and Z has a common type substrate material supporting the one or more of the precious metals, and wherein the common type substrate material supporting the one or more of the precious metals is lanthanum-stabilized aluminum oxide, and wherein the coating X has a lower load quantity lanthanum-stabilized aluminum oxide than that of each of coatings Y and Z, individually.

14. Particle filter according to claim 13, wherein a $d_{50}$ particle size distribution for the coating X is 1 to 3 µm, and for each of Y and Z is from 4 to 8 µm.

15. Particulate filter in accordance with claim 13, wherein the sum of the lengths of the coatings Y and Z is ≤80% of the total filter length L, and an intermediate region between coatings Y and Z presents an exposed coating X.

16. Particulate filter in accordance with claim 13, wherein the coatings X, Y and Z are each free of metal exchanged molecular sieves.

* * * * *